US008230918B2

(12) United States Patent
Ameen

(10) Patent No.: US 8,230,918 B2
(45) Date of Patent: Jul. 31, 2012

(54) METHOD OF CHARACTERIZING HYDROCARBON RESERVOIR FRACTURES IN SITU WITH ARTIFICIALLY ENHANCED MAGNETIC ANISOTROPY

(75) Inventor: Mohammed S. Ameen, Dhahran (SA)

(73) Assignee: Saudi Arabian Oil Company (SA)

( * ) Notice: Subject to any disclaimer, the term of this patent is extended or adjusted under 35 U.S.C. 154(b) by 203 days.

(21) Appl. No.: 11/805,575

(22) Filed: May 24, 2007

(65) Prior Publication Data

US 2008/0290876 A1     Nov. 27, 2008

(51) Int. Cl.
*E21B 49/00*     (2006.01)
(52) U.S. Cl. ..................... 166/250.1; 324/323
(58) Field of Classification Search ............ 166/252.5, 166/252.6, 250.01, 250.1; 324/326, 323, 324/353
See application file for complete search history.

(56) References Cited

U.S. PATENT DOCUMENTS

| | | | | |
|---|---|---|---|---|
| 4,427,944 | A * | 1/1984 | Chandler ................... | 324/353 |
| 4,491,796 | A | 1/1985 | Smith | |
| 5,151,658 | A | 9/1992 | Muramatsu | |
| 5,519,322 | A * | 5/1996 | Pozzi et al. .............. | 324/346 |
| 6,250,848 | B1 * | 6/2001 | Moridis et al. ............ | 405/263 |
| 6,998,845 | B2 * | 2/2006 | Martin et al. ............. | 324/346 |
| 7,000,697 | B2 * | 2/2006 | Goode et al. ............. | 166/250.17 |
| 7,126,340 | B1 | 10/2006 | Ameen | |
| 7,424,911 | B2 * | 9/2008 | McCarthy et al. ......... | 166/250.12 |
| 7,439,743 | B2 * | 10/2008 | Potter ........................ | 324/377 |
| 2004/0251022 | A1 * | 12/2004 | Smith ....................... | 166/250.17 |
| 2006/0102345 | A1 * | 5/2006 | McCarthy et al. ........ | 166/250.1 |

OTHER PUBLICATIONS

Cook, N.G.W., Geophysical and Transport Properties of Reservoir Rocks, Summary Annual Report, Contract No. DE-AC22-89 BC 14475, University of California at Berkeley, Berkeley, CA 94720, Aug. 29, 1990, 7 pages, report No. DOE/BC/14475-T1.
Fracture Porosity, Schlumberger Oilfield Glossary, http://www.glossary.oilfied.slb.com/Display.cfm?Term=fracture%20porosity, 2001, retrieved on Jan. 6, 2012, 1 page.
Fracture Permeability, Schlumberger Oilfield Glossary, http://wvvw.glossary.oilfied.slb.com/Display.cfm?Term=fracture %20permeability, 2001, retrieved on Jan. 6, 2012, 1 page.
Porosity, from Wikipedia, the free encyclopedia, http://en.wikipedia.org/wiki/Porosity, May 18, 2005, retrieved on Mar. 30, 2012, 2 pages.
Petrophysics, from Wikipedia, the free encyclopedia, http://en.wikipedia.org/wiki/Petrophysics, Sep. 13, 2006, retrieved on Mar. 30, 2012, 1 page.

* cited by examiner

*Primary Examiner* — Daniel P Stephenson
*Assistant Examiner* — Kipp Wallace
(74) *Attorney, Agent, or Firm* — Bracewell & Giuliani LLP

(57) ABSTRACT

Reservoir fractures are characterized directly in situ without need to acquire and analyze formation sample cores. A magnetic fluid is injected into an isolated section of the reservoir. The magnitude and directional properties of the enhanced magnetic susceptibility in the section where magnetic fluid injection occurs is measured with a down hole magnetometer. Logs obtained of the enhanced magnetic susceptibility are analyzed to characterize fractures, and petrophysical properties of interest, such as porosity, permeability, and permeability anisotropy of the formation in the vicinity of the fluid injection.

35 Claims, 4 Drawing Sheets

Magnetometer with Gyro
Measurement before and after
Magnetic Fluid Injection

METHOD OF CHARACTERIZING HYDROCARBON RESERVOIR FRACTURES IN SITU WITH ARTIFICIALLY ENHANCED MAGNETIC ANISOTROPY

BACKGROUND OF THE INVENTION

1. Field of the Invention

The present invention relates to reservoir characterization, and in particular to fracture characterization of hydrocarbon reservoirs to determine petrophysical properties of interest concerning the reservoirs.

2. Description of the Related Art

Fractures in formation rock in subsurface hydrocarbon reservoirs impact the permeability of the reservoir formations. In addition, fractures in non-reservoir intervals affect communication of fluids between reservoirs above and below such intervals, and cause problems in reservoir development and management. Characterizing fractures has been a challenge. So far as is known, fracture characterization has been based on detecting the existence of fractures and attempting to assess their petrophysical properties. Assessment of petrophysical properties has been the most challenging aspect of fracture characterization.

Current methods, so far as is known, have been geometrical based on using borehole imagery or cores to detect and determine the orientation of microfractures. These current methods have been limited to measurements obtained from the borehole wall or a cored section volume. So far as is known, they do not give a direct measure of the impact of fractures on reservoir performance and petrophysics.

U.S. Pat. No. 7,126,340, which issued Oct. 24, 2006, and of which applicant is a named inventor, relates to techniques of characterizing microfractures based on analysis of core samples, also known as plugs, using anisotropy enhanced of magnetic susceptibility. These techniques are based on core samples. As such, the techniques can not be applied to fractures larger than those capable of being encountered in a plug sample. These larger fractures are referred to as meso-fractures or macro-fractures.

In-situ magnetic measurement technologies have so far as is known been limited to measuring natural magnetic polarities and magnetic field intensities in shallow depths in the earth, on the order of hundreds of meters. Thus, in-situ magnetic anisotropy measurements have not been available for characterization of reservoir rock fractures.

SUMMARY OF THE INVENTION

Briefly, the present invention provides a new and improved method of analyzing a subsurface hydrocarbon reservoir of interest to characterize fractures in the reservoir rock in the reservoir and its immediate vicinity. A formation test section adjacent a borehole in the reservoir is isolated from fluid flow from other portions of the formation. A base magnetic parameter of the formation test section is then determined. A magnetic fluid is injected into the formation test section to enhance the magnetic parameters of the formation test section. An enhanced magnetic parameter of the formation test section with the injected magnetic fluid is then determined. From the base magnetic parameter and the enhanced magnetic parameter a characterization of fractures in the subsurface hydrocarbon reservoir is then determined.

Well logging data obtained of the enhanced magnetic susceptibility are analyzed to characterize petrophysical properties of interest, such as porosity, permeability, and permeability anisotropy of the formation in the vicinity of the fluid injection.

Characteristics of hydrocarbon reservoirs which are obtainable based on the processing results and analysis of logging data include fracture direction and fracture orientation.

BRIEF DESCRIPTION OF THE DRAWINGS

The objects, advantages and features of the invention will become more apparent by reference to the drawings appended thereto, wherein like numerals indicate like parts and wherein an illustrated embodiment of the invention is shown, of which.

DETAILED DESCRIPTION OF THE PREFERRED EMBODIMENTS

Figure 1:
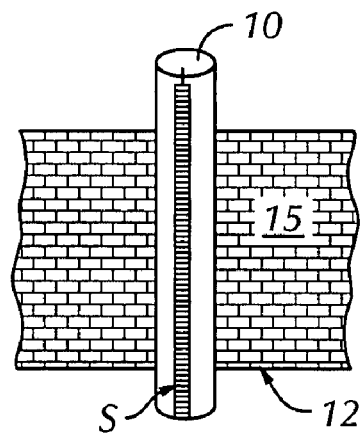
FIG. 1 is a schematic diagram, taken partly in cross-section, of a well logging magnetometer sonde in a well borehole adjacent a subsurface formation for measuring base magnetic parameter data according to the present invention.
Figure 9:
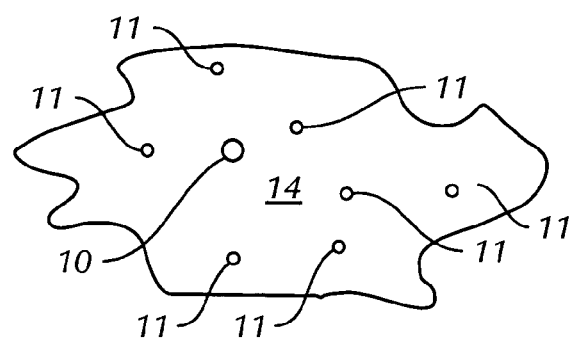
FIG. 9 is a schematic diagram of several well locations for adjacent well boreholes in a hydrocarbon reservoir.

In the drawings, a well logging sonde S is shown in FIG. 1 in a well bore 10 which has been drilled through a series of subsurface formations, including a subsurface formation or reservoir 12 of possible hydrocarbon production interest. As can be seen in FIG. 9, the well bore 10 along with a number of other well bores 11 is formed in a region or field 14 where the reservoir 12 is located. With the present invention, magnetic data is obtained so that fractures in formation rock 15 of the reservoir 12 may be characterized and analyzed. The sonde S (FIGS. 1, 2 and 3A) is lowered by a conductive wire line cable 16 (FIG. 3A) into selected well bores in the field 14, such as the well bore 10, and readings from instrumentation in the sonde S are transferred over the wire line 16 to obtain the responses of subsurface formations such as that shown at 15 to well logging instruments in the sonde S.

With the present invention, the sonde S contains sensing instrumentation including a suitable magnetometer or magnetic sensor 22 (FIG. 3B), such as a three-component flux gate magnetometer for sensing magnetic data concerning the subsurface formations of interest, and instrumentation 24 for determining the spatial orientation of the sonde S at the locations where magnetic readings are obtained. The spatial orientation measurements may be made as shown schematically at 24 by inclinometers 24 and a gyrocompass 26 or some other suitable form of position/orientation detector indicator. An example of such a sonde is that known as a 3D Borehole Magnetometer of BGR, or Bundesanstalt Für Geowissentschaften und Rohrsstoffe (translated as Federal Institute for Geosciences and Natural Resources) of Hannover, Germany. It should be understood that other arrangements and types of magnetometers and spatial orientation sensors from other sources may be used, as well. Further, it should be understood that fixed, in situ monitors can be installed in the well bores of interest to obtain magnetic data readings rather than obtaining such readings from wireline logging sensors, if desired.

In addition, it should be understood that other types of well logging equipment and instrumentation shown schematically at 28 in addition to the magnetometers and spatial orientation sensors may be mounted in the sonde S or otherwise located in the well bores. Readings may be obtained from the additional well logging instrumentation and used, if desired, so that other types of well logging measurements could be obtained from the subsurface formations. Examples include a resistivity log, such as an induction log or laterolog; a gamma ray log; and a porosity log, such as a density log, neutron log, or sonic log.

Figure 3A:
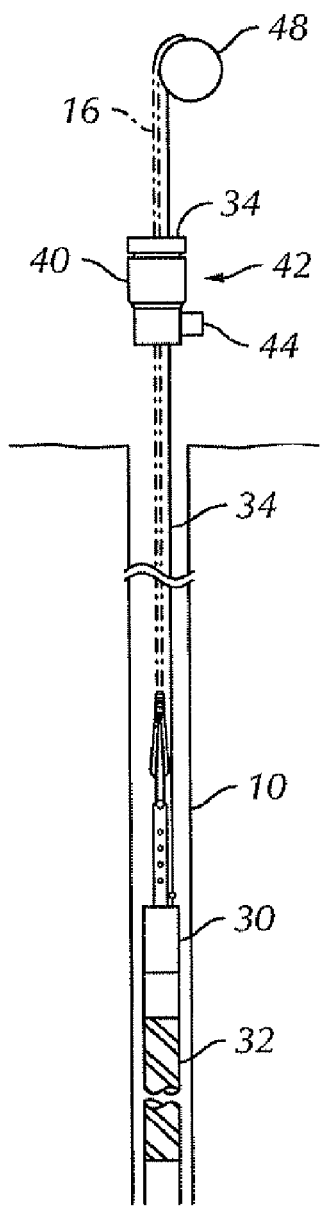
FIGS. 3A, 3B and 3C are more detailed schematic diagrams, taken partly in cross-section, of successively vertically arranged portions of a well logging tool of the type shown in FIGS. 1 and 2.
Figure 3B:
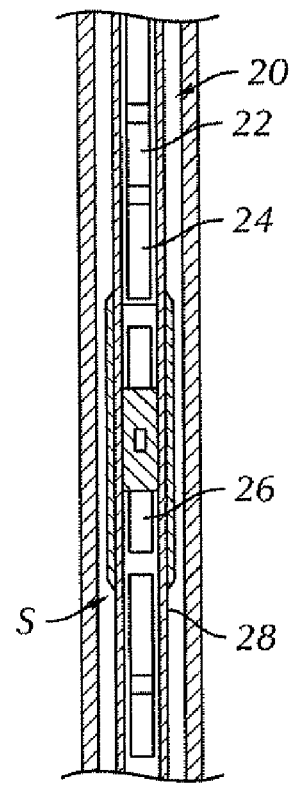
Figure 3C:
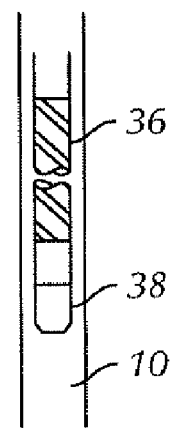
Figure 4:
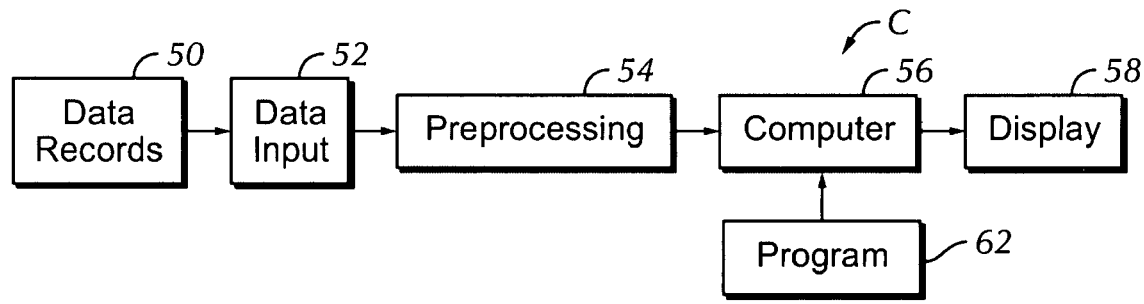
FIG. 4 is a schematic diagram of surface processing, recording and display components used in a well logging system in connection with the well logging sonde of FIGS. 1, 2, 3A, 3B and 3C.

FIGS. 3A, 3B and 3C illustrate schematically in greater detail an example structure of a well tool assembly A including the sonde S. The sonde S includes an instrumentation compartment 20 containing well logging sensors, including magnetometers 22 and spatial orientation sensors, such as inclinometers 24 and a gyrocompass 26, as described above. Typically, as is conventional, the well logging sensors are controlled by a down hole microcontroller and furnish data measurements over the wire line 16 to a surface instrumentation and computer unit or module C (FIG. 4) to be described below.

The instrumentation compartment 20 of the sonde S is mounted below a top connector subassembly 30 (FIG. 3A) and an inflatable top packer 32 which are connected to the wire line 16 and to a packer inflation fluid tube 34. The wire line 16 provides communication of control signals from the surface instrumentation and computer unit C. The packer inflation fluid tube 34 conveys and applies fluid under suitable pressures to selectively inflate or deflate the top packer 32 and a bottom packer 36 (FIG. 3C). The bottom packer 36 is mounted below the instrumentation of the sonde S above an end sub or nose plug assembly 38.

Figure 2:
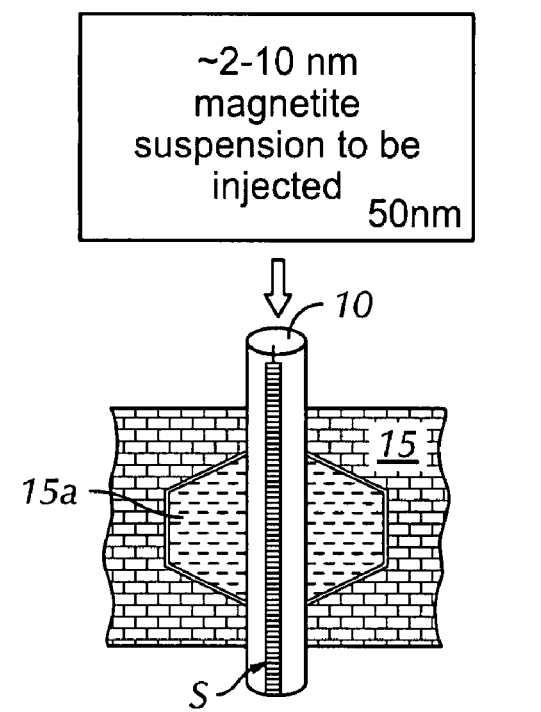
FIG. 2 is a schematic diagram, taken partly in cross-section, of the well logging magnetometer sonde and subsurface formation of FIG. 1 after injection of a magnetic fluid suspension into the formation for measuring enhanced magnetic parameter data according to the present invention.

The top packer 32 and bottom packer 36 are adapted to be inflated by fluid pressure from the packer inflation tube 34 when the sonde S is at a selected depth in the well bore adjacent a formation 15 or a portion of such a formation (FIGS. 1 and 2) to isolate a test section of the formation from well fluid flow, as will be described below. A top seal assembly 40 at a well head 42 above the well bore 10 is provided to receive fluid at a fluid inlet port 44. The fluid inlet port 44 may be connected to receive a magnetic fluid under a desired pressure for introduction into a test section 15a of a formation 15 of interest (FIGS. 1 and 2). The magnetic fluid injection occurs after the test section 15a has been isolated by inflation of at least the bottom well packer 36 and if desired the top well packer 32.

During the well logging and formation injection runs, the sonde S and wire line cable 16 are suitably supported such as by a sheave wheel, one of which is shown at 48. The well logging measurements obtained by the well logging instruments in the sonde S are recorded as functions of borehole depth in a suitable data memory 50 of the surface computer or data processing system C Once recorded, the well logging data measurements may be transferred as needed into a data input unit 52 of the data processing system C. The well logging data measurements are subjected to conventional preprocessing in a preprocessing unit 54 and then to a computer processor 56 of the data processing system C for processing (FIG. 4) according to the present invention.

As will be set forth below, the magnetic logging data obtained from the instrumentation in the sonde S is stored after preliminary processing. The data is thereafter processed to determine a measure of well magnetic parameter, such as magnetic susceptibility and magnetic susceptibility anisotropy, as a function of borehole depth, and a record or log 60 (FIG. 6) of that parameter as a function of borehole depth is formed. The sensed magnetic parameters from the formation of interest are thereafter processed to determine the porosity, permeability and permeability anisotropy of the test formation in the vicinity of the fluid injection.

Figure 6:
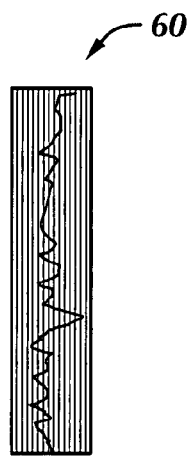
FIG. 6 is a plot of a well log of formation magnetic susceptibility as a function of borehole depth according to the present invention.
Figure 7:
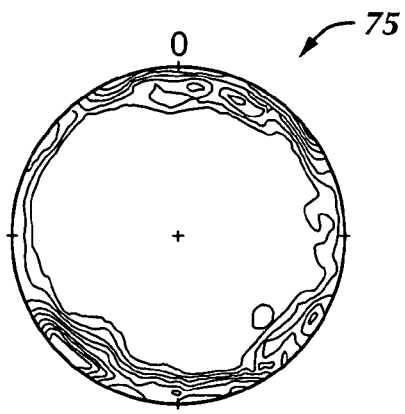
FIG. 7 is a plot of susceptibility anisotropy parameter, orientation in a subsurface formation adjacent a well bore according to the present invention.
Figure 8:
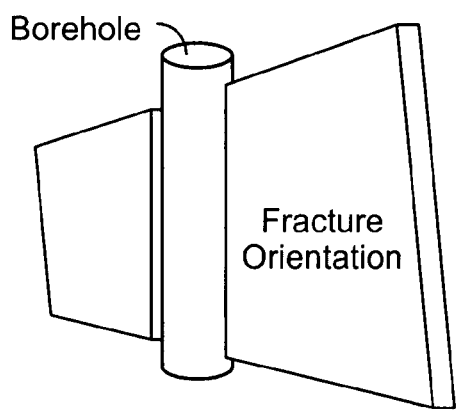
FIG. 8 is a schematic representation of formation fracture orientation in the vicinity of a well borehole as determined in accordance with the present invention.

The processing is performed in the computer processor 56 (FIG. 4) and may take the form of several commercially available magnetic well logging data processing techniques to determine the porosity, permeability and permeability anisotropy of the test formation. Processing of the magnetic data from the sonde instrumentation may also be according to the techniques of co-pending U.S. Pat. No. 7,126,340 of which applicant is a named inventor. The processed results from computer 56 (FIG. 4) are then available for analysis on a suitable display or plotter 58. FIGS. 6 and 7 represent examples of such data displays.

The computer 56 can be a mainframe computer of any conventional type of suitable processing capacity such as those available from International Business Machines (IBM) of Armonk, N.Y. or other source. Other digital processors, however, may be used, such as a laptop computer, notebook computer or any other suitable processing apparatus.

In any case, the processor of the computer 56 accesses the well logging data measurements to undertake the logic of the present invention, which may be executed by a processor as a series of computer-executable instructions. The instructions may be contained on a data storage device 62 with a computer readable medium, such as a computer diskette shown in FIG. 4 having a computer usable medium stored thereon. Or, the instructions may be stored in memory of the computer 56, or on magnetic tape, conventional hard disk drive, electronic read-only memory, optical storage device, or other appropriate data storage device.

Figure 5:
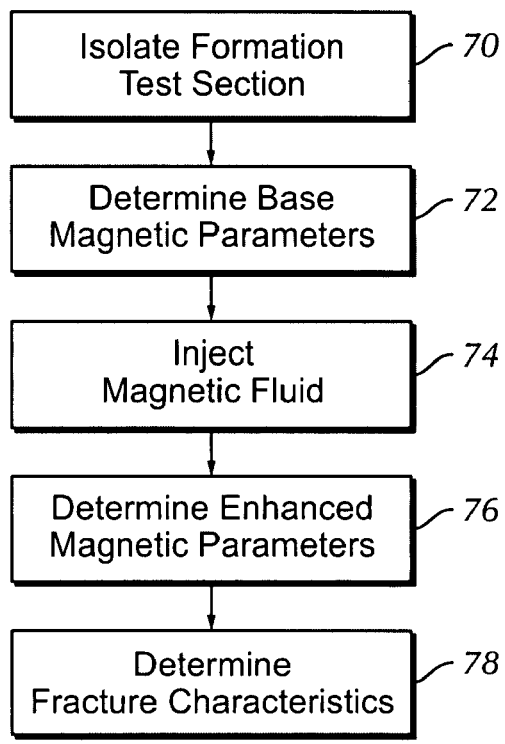
FIG. 5 is a schematic diagram of a sequence of process steps for according to the present invention.

FIG. 5 illustrates schematically a preferred sequence of steps of a process for analyzing a subsurface reservoir of interest to characterize fractures in formation rock in the reservoir. As shown at step 70, a test formation section such as that shown at 15 is isolated from fluid flow from portions of the reservoir by inflation of packers of the well tool assembly A when the sonde S is at a desired position in the well bore 10.

The magnetic instrumentation components 22 in the sonde S are then used to obtain magnetic readings of the formation. The magnetic readings so obtained are then processed in the computer 56 to determine as indicated at step 72 one or more base magnetic parameters of the formation test section 15. Base magnetic parameters include magnetic susceptibility of the formation test section; natural magnetization of the formation test section; a magnetic component or contribution from the ferromagnetic material or elements of tubing in the well; natural magnetic susceptibility; a base magnetic field of the earth and formation at the formation test section; and base magnetic anisotropy of the formation test section. The base magnetic parameters serve as a data baseline for subsequent comparison and analysis, as will be set forth below.

Next as indicated at step 74 of FIG. 5, a magnetic fluid is injected into the formation test section 15 to enhance the magnetic parameters of a region 15a of the formation test section 15. A suitable such fluid is one with a magnetite suspension of particles of a suitable size based on the expected nature of the formation rock in the test section. An example particle size is approximately from about 2 to about 10 nm in size. Fluids of this type are available, for example, from Liquid Research, Ltd. Of Bangor, Wales, U.K. The magnetic fluid then moves through the reservoir 12 according to the petrophysical properties of the formation rock and data obtained with the present invention is used to investigate these properties including the fracture characteristics. It should be understood that the present invention is used to investigate various sizes of fractures in situ, including fractures of such a large size as to be fully encountered in core or plug samples, to fractures of the size of microfractures.

After the magnetic fluid has been injected and penetrated the formation test section, the magnetic instrumentation 22 in the sonde S is then again used to obtain magnetic readings of the formation. The magnetic readings so obtained are then processed in the computer 56 to determine as indicated at step 76 of one or more enhanced magnetic parameters of the magnetic fluid-injected formation test section 15a. Enhanced magnetic parameters include enhanced magnetic susceptibility of the magnetic fluid-injected formation test section; enhanced magnetization of the magnetic fluid-injected formation test section; enhanced magnetic field of the earth and formation at the fluid-injected formation test section; and enhanced magnetic anisotropy of the fluid-injected formation test section.

The base magnetic parameter readings obtained as disclosed above before injection of the magnetic fluid serve as a base line against which the enhanced magnetic parameters obtained after magnetic fluid injection may be compared to determine characterizations of fractures in the formation test section of interest. The present invention is used to characterize a number of forms and sizes of fractures, as noted.

FIG. 7 is an example display 75 of magnetic susceptibility orientation of a formation test section at a selected depth in the well bore 10. Processing of data to obtain magnetic susceptibility orientation of the type shown in FIG. 7 may be done, for example, according to the techniques described in U.S. Pat. No. 7,126,340 mentioned above. The information content of the display 75 varies according to the fracture characterization of the formation rock under investigation. Data processing to form displays of the type shown at 75 is performed using commercially available techniques such as stereographic projection software available as stereonet from Geological Software and other sources.

In the operation of the present invention, it is typically desirable to initially perform calibration data. For this purpose, an existing open hole in a section of a rock sequence with known low porosity and permeability rock is selected as a calibration test section. Alternatively, such a calibration test section may be reached by drilling of a new or "pilot" bore hole. Existing fractures in the section are then detected and characterized, using conventional core and image logs.

Flow meter test and interference tests are then run in the conventional manner to determine existing preferential communication vertically in the well and horizontally with adjacent wells. With this data the rate of fluid communication can then be assessed.

Next, the borehole-fluid properties at regular intervals throughout the pilot borehole, or a baseline survey, including chemical, biological, and physical properties, are characterized. Sampling as well as down-hole fixed sensors/wire line tools may be used as appropriate.

Data measurements can then be obtained of base magnetic parameters including tool orientation. As noted, this is done by first isolating one or more test sections up to a few meters thick each. A few test sections are recommended for repeated tests. The well logging tool assembly A including the sonde S is then run in the bore hole. If desired, as noted, the magnetic data can be obtained from fixed down-hole sensors. The data readings obtained using either type of sensing technique measure the base or natural and pipe/assembly-related magnetic susceptibility, and magnetic field and the magnetic anisotropy parameters.

In each of the tested sections a fluid suspension of nanometer-scale magnetic particles is then injected under a suitable low pressure. The volume of the fluid and its concentration are established and constrained as a part of the injection process. This is done to optimize the fluid concentration and properties.

After the magnetic fluid injection is completed, the magnetic logging tool assembly is then used to obtain magnetic data readings including tool orientation in each test section. Preferably such data readings are thereafter performed repeatedly at regular time intervals, from the time of the initial magnetic fluid injection. If the tests are conducted using fixed down-hole tools, real-time continuous measurements are obtainable.

Magnetic data from logs or fixed down-hole sensors are also obtained from adjacent well bores 11 to monitor the adjacent wells for first arrival of the magnetic fluid traces. Magnetic data from logs or fixed down-hole sensors are also obtained to monitor formations in the sections of the well bore 10 immediately above and below the test-interval 15 for magnetic fluid traces.

Logs or data so obtained are then processed as indicated at step 78 (FIG. 5) in the computer unit C. The processed results so obtained from the log data represents fracture characteristics of the formation rock The processed results obtained from the log data are used to characterize the changes in the induced magnetic susceptibility before and after the injection of the magnetic fluid, and then with time after the injection. The log data, combined with the concentration of the magnetic fluid, volume of tested borehole section and the injected volume are thus used to characterize the effective porosity, and permeability (from dissipation diffusion rate), as well as permeability anisotropy. Where the fractures are the main or sole source of porosity and/or permeability, then their petrophysics can be delineated. Fracture orientation can be detected if the developed tool can be made to measure magnetic anisotropy down-hole.

The present invention is a non-destructive method, in that there is no need for routine core acquisitions from each well in the target reservoir or zone. Also the present invention reduces logging costs by diminishing the amount of core and image logging required, as well as the processing and interpretation for such data. The present invention affords a quicker and direct link between fractures and petrophysics without requiring petrophysical testing of a core sample. The data obtained are quantitative in that values of porosity and permeability can be obtained from the magnetic data, as well as the concentration of the magnetic fluid, volume of tested borehole section and the injected magnetic fluid volume.

The invention has been sufficiently described so that a person with average knowledge in the matter may reproduce and obtain the results mentioned in the invention herein. Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A method of analyzing formation fractures in formation rock of interest in a subsurface hydrocarbon reservoir to characterize the petrophysical properties of the fractures based on measurements obtained from magnetic instrumentation in a well tool assembly having inflatable packers therewith, comprising the steps of:
- lowering the well tool assembly in a well borehole in the reservoir to a position adjacent the formation rock of interest;
- isolating a formation test section of the formation rock of interest adjacent the well borehole in the reservoir from fluid flow from other portions of the reservoir by inflation of at least one of the inflatable packers of the well tool assembly at the position adjacent the formation rock of interest;
- obtaining base magnetic readings from the isolated formation test section with the magnetic instrumentation in the well tool assembly;
- determining a base magnetic parameter of the formation rock of interest based on the obtained base magnetic readings from the isolated formation test section;
- injecting a volume of a magnetic fluid into the isolated formation test section to enhance the magnetic parameters of the isolated formation test section while the well tool assembly is in position in the well borehole isolating the formation test section;
- obtaining enhanced magnetic readings with the magnetic instrumentation in the well tool assembly from the isolated formation test section containing the injected volume of magnetic fluid;
- determining an enhanced magnetic parameter of the formation rock of interest based on the enhanced magnetic readings obtained from the isolated formation test section with the volume of injected magnetic fluid therein; and
- determining from the base magnetic parameter, the enhanced magnetic parameter of the formation rock of interest, and the injected volume of magnetic fluid a characterization of the petrophysical properties of the formation fractures in the formation rock of interest in the subsurface hydrocarbon reservoir.

2. The method of claim 1, wherein the base magnetic parameter comprises magnetic susceptibility.

3. The method of claim 1, wherein the enhanced magnetic parameter comprises enhanced magnetic susceptibility.

4. The method of claim 1, wherein the base magnetic parameter comprises natural magnetization.

5. The method of claim 1, wherein the enhanced magnetic parameter comprises enhanced magnetization.

6. The method of claim 1, wherein the base magnetic parameter comprises a magnetic component from tubing in the well.

7. The method of claim 1, wherein the base magnetic parameter comprises natural magnetic susceptibility.

8. The method of claim 1, wherein the enhanced magnetic parameter comprises enhanced magnetic susceptibility of the fluid-injected formation test section.

9. The method of claim 1, wherein the base magnetic parameter comprises a base magnetic field.

10. The method of claim 1, wherein the enhanced magnetic parameter comprises an enhanced magnetic field.

11. The method of claim 1, wherein the base magnetic parameter comprises a base magnetic anisotropy.

12. The method of claim 1, wherein the enhanced magnetic parameter comprises enhanced magnetic anisotropy.

13. The method of claim 1, wherein the netrophysical properties of the fractures comprise fracture porosity.

14. The method of claim 1, wherein the petrophysical properties of the fractures comprise permeability.

15. The method of claim 1, further including the step of characterizing the anisotropy of formation rock in the subsurface hydrocarbon reservoir.

16. The method of claim 1, further including the step of determining magnetic foliation of the formation test section.

17. The method of claim 1, further including the step of determining magnetic lineation of the formation test section.

18. The method of claim 1, the step of determining magnetic anisotropy degree of the formation test section.

19. The method of claim 2, further including the steps of:
- determining background magnetization of the formation test section; and
- removing spurious magnetism from the formation test section magnetic parameters determinations prior to determining the magnetic susceptibility of the formation test section.

20. The method of claim 2, wherein the magnetic susceptibility comprises magnetic susceptibility of the formation test section.

21. The method of claim 2, wherein the magnetic susceptibility comprises natural magnetic susceptibility.

22. The method of claim 1, wherein the magnetic fluid comprises a fluid containing a magnetite suspension of particles.

23. The method of claim 1, wherein the step of injecting a magnetic fluid is performed subsequent to the step of obtaining a base magnetic reading.

24. A method of analyzing microfractures in formation rock of interest in a subsurface hydrocarbon reservoir to characterize the petrophysical properties of the microfractures in the formation rock based on measurements obtained from magnetic instrumentation in a well tool assembly having inflatable packers therewith, comprising the steps of:
- lowering the well tool assembly in a well borehole in the reservoir to a position adjacent the formation rock of interest;
- isolating a formation test section of the formation rock of interest adjacent the well borehole in the reservoir from fluid flow from other portions of the reservoir by inflation of at least one of the inflatable packers of the well tool assembly at the position adjacent the formation rock of interest;
- obtaining base magnetic readings from the isolated formation test section with the magnetic instrumentation in the well tool assembly;
- determining a base magnetic parameter of the formation rock of interest based on the obtained base magnetic readings from the isolated formation test section;
- injecting a volume of magnetic fluid containing a magnetite suspension of particles into the isolated formation test section to enhance the magnetic parameters of the isolated formation test section while the well tool assembly is in position in the well borehole isolating the formation test section;

obtaining enhanced magnetic readings with the magnetic instrumentation in the well tool assembly from the isolated formation test section containing the injected volume of fluid containing the magnetite suspension of particles;

determining an enhanced magnetic parameter of the formation rock of interest based on the enhanced magnetic readings obtained from the formation test section containing the injected volume of magnetic fluid; and determining from the base magnetic parameter, the enhanced magnetic parameter of the formation rock of interest, and the injected volume of magnetic fluid a characterization of the petrophysical properties of the microfractures in the formation rock of interest in the subsurface hydrocarbon reservoir.

25. The method of claim 24, wherein particle size of the magnetite suspension of particles in the magnetic fluid is from about 2 to about 10 nm.

26. The method of claim 24, wherein the step of injecting a magnetic fluid is performed subsequent to the step of obtaining a base magnetic reading.

27. A method of analyzing microfractures in formation rock of interest in a subsurface hydrocarbon reservoir to characterize petrophysical properties of the microfractures in the formation rock based on measurements obtained from magnetic instrumentation in a well tool assembly having inflatable packers therewith, comprising the steps of:

lowering the well tool assembly in a well borehole in the reservoir to a position adjacent the formation rock of interest;

isolating a formation test section of the formation rock of interest adjacent the well borehole in the reservoir from fluid flow from other portions of the reservoir by inflation of at least one of the inflatable packers of the well tool assembly at the position adjacent the formation rock of interest;

obtaining base magnetic readings from the isolated formation test section with the magnetic instrumentation in the well tool assembly;

determining a base magnetic parameter of the formation rock of interest based on the obtained base magnetic readings from the isolated formation test section;

after obtaining base magnetic readings and while the well tool is located at the isolated formation test section, injecting a volume of magnetic fluid into the isolated formation test section to enhance the magnetic parameters of the isolated formation test;

obtaining enhanced magnetic readings with the magnetic instrumentation in the well tool assembly located at the isolated formation test section containing the injected volume of magnetic fluid;

determining an enhanced magnetic parameter of the formation rock of interest based on the enhanced magnetic readings obtained from the formation test section containing the injected volume of magnetic fluid; and determining from the base magnetic parameter, the enhanced magnetic parameter of the formation rock of interest, and the injected volume of magnetic fluid a characterization of the petrophysical properties of the microfractures in the formation rock of interest in the subsurface hydrocarbon reservoir.

28. A method of analyzing formation fractures in formation rock of interest in a subsurface hydrocarbon reservoir to characterize the petrophysical properties of the fractures based on measurements obtained from magnetic instrumentation in a well tool assembly having inflatable packers therewith, comprising the steps of:

lowering the well tool assembly in a well borehole in the reservoir to a position adjacent the formation rock of interest;

isolating a formation test section of the formation rock of interest adjacent the well borehole in the reservoir from fluid flow from other portions of the reservoir by inflation of at least one of the inflatable packers of the well tool assembly at the position adjacent the formation rock of interest;

obtaining base magnetic readings from the isolated formation test section with the magnetic instrumentation in the well tool assembly;

determining a base magnetic parameter of the formation rock of interest based on the obtained base magnetic readings from the isolated formation test section;

injecting a volume of magnetic fluid into the isolated formation test section to enhance the magnetic parameters of the isolated formation test section;

obtaining enhanced magnetic readings with the magnetic instrumentation in the well tool assembly from the isolated formation test section containing the injected volume of magnetic fluid;

determining an enhanced magnetic parameter of the formation rock of interest based on the enhanced magnetic readings obtained from the isolated formation test section with the volume of injected magnetic fluid therein; and determining from the base magnetic parameter, and the enhanced magnetic parameter of the formation rock of interest and the injected volume of magnetic fluid a characterization of petrophysical properties of the fractures in the formation rock of interest in the sub surface hydrocarbon reservoir.

29. The method of claim 28, wherein the petrophysical properties of the fractures comprise fracture porosity.

30. The method of claim 28, wherein the petrophysical properties of the fractures comprise permeability.

31. A method of analyzing microfractures in formation rock of interest in a subsurface hydrocarbon reservoir to characterize the petrophysical properties of the microfractures in the formation rock based on measurements obtained from magnetic instrumentation in a well tool assembly having inflatable packers therewith, comprising the steps of:

lowering the well tool assembly in a well borehole in the reservoir to a position adjacent the formation rock of interest;

isolating a formation test section of the formation rock of interest adjacent the well borehole in the reservoir from fluid flow from other portions of the reservoir by inflation of at least one of the inflatable packers of the well tool assembly at the position adjacent the formation rock of interest;

obtaining base magnetic readings from the isolated formation test section with the magnetic instrumentation in the well tool assembly;

determining a base magnetic parameter of the formation rock of interest based on the obtained base magnetic readings from the isolated formation test section;

injecting a volume of magnetic fluid containing a magnetite suspension of particles into the isolated formation test section to enhance the magnetic parameters of the isolated formation test section;

obtaining enhanced magnetic readings with the magnetic instrumentation in the well tool assembly from the isolated formation test section containing the injected volume of fluid containing the magnetite suspension of particles;

determining an enhanced magnetic parameter of the formation rock of interest based on the enhanced magnetic readings obtained from the formation test section containing the injected volume of magnetic fluid containing the magnetite suspension of particles; and determining from the base magnetic parameter, the enhanced magnetic parameter of the formation rock of interest, and the injected volume of magnetic fluid a characterization of the petrophysical properties of the microfractures in the formation rock of interest in the subsurface hydrocarbon reservoir.

32. The method of claim 31, wherein the petrophysical properties of the fractures comprise fracture porosity.

33. The method of claim 31, wherein the petrophysical properties of the fractures comprise permeability.

34. The method of claim 31, wherein the fractures comprise microfractures.

35. A method of analyzing formation fractures in formation rock of interest in a subsurface hydrocarbon reservoir to characterize the petrophysical properties of the fractures based on measurements obtained from magnetic instrumentation in a well tool assembly having inflatable packers therewith, comprising the steps of:

lowering the well tool assembly in a well borehole in the reservoir to a position adjacent the formation rock of interest;

isolating a formation test section of the formation rock of interest adjacent the well borehole in the reservoir from fluid flow from other portions of the reservoir by inflation of at least one of the inflatable packers of the well tool assembly at the position adjacent the formation rock of interest;

obtaining base magnetic readings from the isolated formation test section with the magnetic instrumentation in the well tool assembly;

determining a base magnetic parameter of the formation rock of interest based on the obtained base magnetic readings from the isolated formation test section;

after obtaining base magnetic readings and while the well tool is located at the isolated formation test section, injecting a controlled volume of a magnetic fluid into the isolated formation test section to enhance the magnetic parameters of the isolated formation test section while the well tool assembly is in position in the well borehole isolating the formation test section;

obtaining enhanced magnetic readings with the magnetic instrumentation in the well tool assembly from the isolated formation test section containing the injected volume of magnetic fluid;

determining an enhanced magnetic parameter of the formation rock of interest based on the enhanced magnetic readings obtained from the isolated formation test section with the volume of injected magnetic fluid therein; and determining from the base magnetic parameter, the enhanced magnetic parameter of the formation rock of interest, and the injected controlled volume of magnetic fluid a characterization of formation fractures in the formation rock of interest in the subsurface hydrocarbon reservoir.

\* \* \* \* \*

UNITED STATES PATENT AND TRADEMARK OFFICE
CERTIFICATE OF CORRECTION

PATENT NO. : 8,230,918 B2  
APPLICATION NO. : 11/805575  
DATED : July 31, 2012  
INVENTOR(S) : Mohammed S. Ameen It is certified that error appears in the above-identified patent and that said Letters Patent is hereby corrected as shown below:

Column 8, Line 15, Claim 13
replace
"wherein the netrophysical"
with
"wherein the petrophysical"

Signed and Sealed this
Eighteenth Day of September, 2012

David J. Kappos
*Director of the United States Patent and Trademark Office*